Feb. 28, 1967  P. F. NOVAK  3,307,177
NAVIGATION METHOD AND APPARATUS
Filed June 10, 1965

INVENTOR.
PHILIP F. NOVAK
BY
Orland M. Christensen
ATTORNEY 3,307,177
NAVIGATION METHOD AND APPARATUS
Philip F. Novak, Mercer Island, Wash., assignor to The Boeing Company, Seattle, Wash., a corporation of Delaware
Filed June 10, 1965, Ser. No. 462,983
5 Claims. (Cl. 343—5)

This invention relates to an improved system, comprising a novel method and apparatus for navigating over terrain with a degree of precision not ordinarily achieable with conventional equipment. The invention applies particularly to navigation of aircraft; however, the principles involved may also be employed in space craft, submarines and similar vehicles. A broad object hereof is to devise such a system which may employ commercially available or conventional components the general nature and functioning of which are familiar to trained navigation personnel. The invention is herein illustratively described by reference to the presently preferred embodiment thereof; however, it will be recognized that certain modifications and changes therein with respect to details may be made without departing from the essential features involved.

Aircraft navigation using radar and similar techniques is carried out typically by scanning the underlying terrain ahead of the aircraft so as to determine, with the aid of a navigational computer, both course and present position. The radar operator periodically updates information stored in the computer by determining the range and relative bearing from the aircraft to an identifiable check point on the desired ground track. Then, as the aircraft begins to approach the check point the operator selects another farther ahead and repeats the process, such that as the aircraft is passing over the first check point navigational position is being determined from the check point ahead and without reference to the one over which the aircraft is then passing. As a result, degree of accuracy is limited by the accuracy of the radar or other forward sensing scan system being used.

In this disclosure the term "check point" or "identifiable check point" may have reference to an imaginary point, rather than to an actually identifiable point on the terrain. For convenience it is regarded as a point on the desired ground track of the craft and it may not, in all cases, be identifiable from the image of the terrain displayed on the radar or on other display means with which the invention operates. Thus, it may be an imaginary navigation point in the vicinity of and having a known positional relationship to an identifiable point or feature of terrain, such as the tip of a peninsula, a corner reflector, a radiant energy source, etc., which can be readily identified and is the desired "check point." In terms of the method and apparatus of this invention, therefore, it is to be considered that referencing to an identifiable check point is being accomplished whether the identification is being made from the check point itself or from a positionally related point at a distance therefrom but close enough thereto for inclusion in the same terrain image as later explained herein.

A further object hereof is to provide a system for accurately locating the position of a craft in relation to a ground check point or aim point in conjunction with navigational operations and more particularly to determine even small navigational errors with a high degree of accuracy. A related object is to devise such a system in which error detection and utilization thereof for navigational corrections (and, equivalently, for error determinations, such as in the case of aerial photo-map making operations) may be achieved easily and quickly. Accordingly, the system lends itself to use with or integration into conventional navigational systems.

Still another object is to provide a method and apparatus by which to improve the accuracy of navigation with radar and similar systems:

In accordance with this invention, course and position data derived by radar or other method are fed to the navigational computer which determines heading and computes time of arrival over an identifiable check point. At the computed time of arrival or passage over the check point the underlying terrain is viewed or scanned and an image thereof is stored which is referenced to the nadir (i.e. the vertical line between the aircraft and the earth beneath), which image has sufficient field or scope to include the identifiable check point allowing for probable position coordinate errors. Upon this image is superimposed a cursor referenced to the nadir point and displaceable therefrom to the identifiable check point. The means for shifting the cursor resolves its displacement into position error co-ordinates, and signals representing these error co-ordinates are fed as correction signals to the navigational computer so as to update the present position information stored in the computer. Altitude is applied as a proportionality factor. Preferably, the nadir-referenced terrain image is stored so as to allow ample time for identification of the check point therein and displacement of the nadir-referenced cursor. However, the conventional navigation computer, usually being an inertial or equivalent type, "remembers" course and distance values so that it automatically converts coordinate error signals which it receives derived from the terrain image at the instant of check point passover into present position co-ordinate corrections.

These and other features, objects and advantages of the invention will become more fully evident from the following description thereof by reference to the accompanying drawings.

Figure 2:
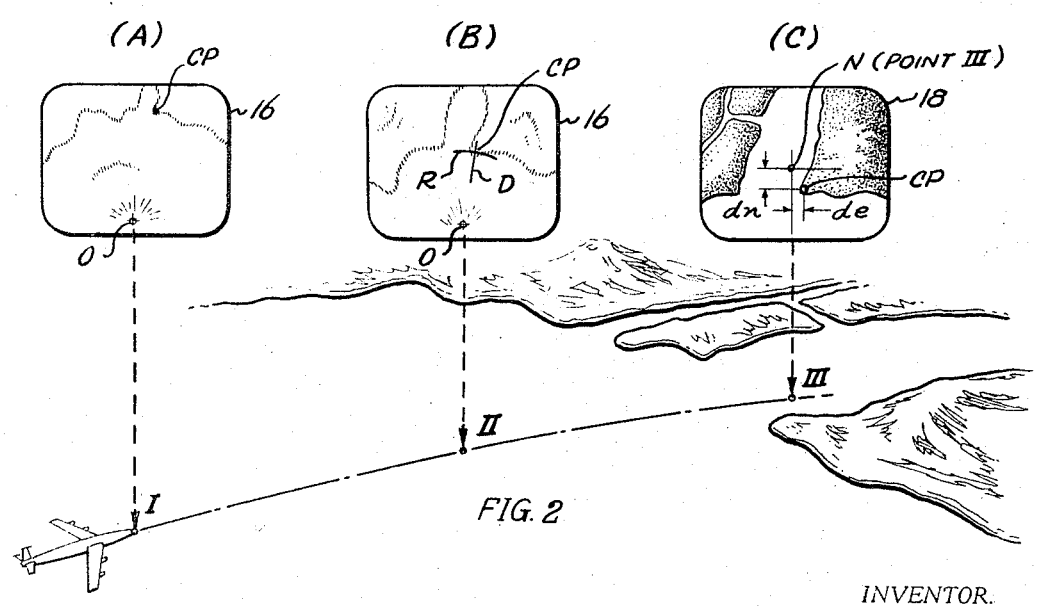
FIGURE 2 is a pictorial diagram illustrating application of the method in a typical case using the system of FIGURE 1.

Referring to the drawings, the navigation computer 10 is incorporated in the aircraft navigation system, usually in conjunction with or as part of an auto pilot, and is or may be conventional equipment of the inertial or equivalent type. Velocity and altitude data are fed to the navigational computer from apparatus depicted as the unit 12 and, in the case of radar-controlled navigation, range and direction information relating present position to a check point ahead of the aircraft are fed to the navigation computer 10 by the radar 14. The radar has a cathode ray tube plan position indicator 16 on the screen of which the point of reference represents the nadir or present position of the aircraft in the usual manner. The radar operator views the display 16 and, as depicted in FIGURE 2(A), identifies the check point CP thereon in its relation to the aircraft's present position O preliminary to determining relative direction and range between points O and CP. This is the stage depicted with the aircraft at position I in FIGURE 2(A). Thereafter, the radar operator, having identified the check point CP, places a range cursor or marker R thereon and also a direction marker D as in FIGURE 2(B), and in the act of setting these markers upon the check point the operator has manipulated controls in the radar system which automatically feed direction and distance data to the navigation computer in the conventional manner. The details of apparatus and operation thereof by which these results obtain are well known and will not be elaborated herein.

Normally, the use of navigational radar in the manner just described involves tracking a check point CP from a conveniently remote initial distance inwardly, as the aircraft approaches it, until the check point becomes inconvenient or difficult to follow on the radar screen with the manual R and D marker adjustments due to the increasingly rapid change of elevation angle from the aircraft to the check point as the check point is closely approached. Therefore, the operator usually abandons a check point which is being closely approached by the aircraft and selects one farther out for repeating the operation and for feeding new data to the navigation computer. Consequently, it has been a problem to obtain present position information for navigational purposes with a high degree of accuracy since the usual navigational techniques employing radars and similar state-of-the-art systems cannot or do not rely upon close sightings, but primarily rely upon remote sightings.

Figure 1:
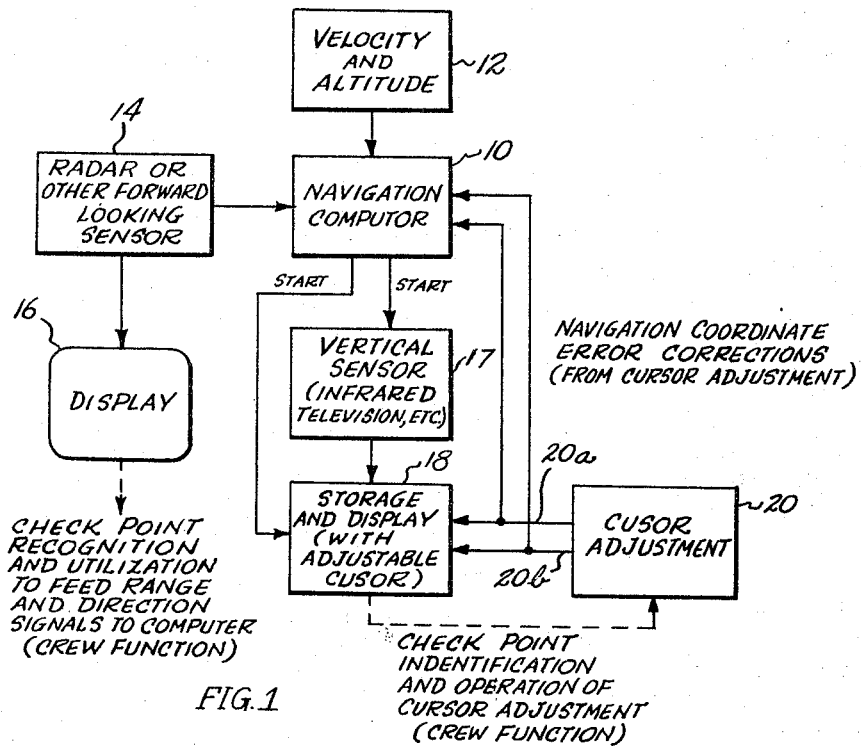
FIGURE 1 is a block diagram functionally illustrating a navigation system in which the present apparatus and method are employed.

In accordance with this invention, the navigational computer is used to determine the computed instant when the aircraft is passing over a check point, so as to trigger or start a vertical sensor, such as an infrared scanner, a television viewing device, or other image forming means capable of viewing an area of terrain directly beneath the aircraft and preferably centered on the nadir. This sensor is designated 17 in FIGURE 1 and preferably includes or operates an image storage and display device 18. The sensor 17 and display device 18 have a sufficient view angle or scope to include the approaching check point in the field of view, with allowances made for probable (maximum) navigational errors. Of course, if the radar guidance has been completely accurate, the check point will appear in direct registry with the cross hair or nadir mark N (FIGURE 2(C)) on the display device 18 and no course corrections will be needed. Usually, however, there will be a navigation error which is resolved in terms of position co-ordinates, one an along-track error co-ordinate $d_n$ and the other a cross-track error co-ordinate $d_e$. A cursor (i.e. light spot, or intersecting light traces, or cross hairs, etc.) referenced to the nadir is then moved from the nadir point N to the position on the display represented by the check point CP (or by a different identifiable navigation point having a known positional relationship to the check point) and, in so doing, correction signals are developed proportionally related to the co-ordinates of position error. The cursor adjustment unit 20 connected to the display unit 18 embodies this function, and by its two solid connecting lines 20a and 20b indicates that the cursor adjustment function results in derivation of the two co-ordinate error components which are fed to the navigational computer 10 in order to correct the present position data stored in the computer. Such error co-ordinates may also be stored or recorded for later use as in the case of aerial map making for example.

Accordingly, each time the aircraft is computed to be passing over a check point, an image of the underlying terrain is formed, and by adjustment of the cursor from the nadir point to the selected navigation point on the display device 18 a navigational correction is made automatically in the navigation computer 10. By successive corrections the navigational computer and the control thereof from radar or other data is progressively refined as the aircraft advances along its course and errors in navigation are determined with great precision at each check point on the way.

These and other aspects of the invention will be evident to those skilled in the art having an understanding of present navigational techniques and of the present disclosure of the improvements presented by this invention.

I claim as my invention:

1. The method of navigating a craft with precision over terrain having an identifiable check point on the desired ground track, comprising utilizing navigational means for guiding the craft toward the check point and for computing time of arrival over the check point; as the craft passes over the check point, as determined by such computation, forming a display which images the area directly below the craft of sufficient scope to include the check point notwithstanding probable navigational error, and upon which image is imposed a visible, selectively movable cursor referenced to the nadir; shifting the cursor across the image to an identifiable navigational reference point bearing a known relationship to the check point so as to derive co-ordinates of positional error at the check point; and utilizing such error co-ordinates for making navigational corrections through said means.

2. The method of navigating a craft with precision over terrain having an identifiable check point on the desired ground track, comprising utilizing navigational computer means for guiding the craft to a position at least approximately overlying the check point; when the craft reaches such position detecting the actual position of the check point in relation to the nadir and displaying the nadir and check point on indicator means for indicating such relationship with relatively movable elements simultaneously viewable at the respective locations of the nadir and check point physically moving such elements relatively across the display into coincidence for deriving coordinates of navigational error to the check point; and feeding such error co-ordinates into said computer means for making navigational corrections.

3. The method of locating a craft with precision over terrain having an identifiable check point on the desired ground track, comprising utilizing navigational means including computer means for guding the craft toward the check point and for computing time of arrival over the check point; as the craft passes over the check point, as determined by such navigational computer means, forming and storing a display which images the area directly below the craft of sufficient scope to include the check point and an identifiable navigational reference point the same as or in the vicinity of the check point notwithstanding probable navigational error, and upon which image is imposed a visible, selectively movable cursor referenced to the nadir; shifting the cursor across the image to the reference point location thereon so as to derive co-ordinates of navigational position error at the check point; and feeding such error co-ordinates into said computer means for updating the data stored therein.

4. Apparatus for navigating a craft with precision over terrain having an identifiable check point on the desired ground track, comprising navigational computer means adapted to compute course and time of arrival at a position over the check point, terrain viewing means and operatively related terrain image display means referenced to the nadir and operable to present a viewable image of the terrain directly below the craft including the check point and an identifiable navigational reference point positionally related to or the same as the check point when the craft is approximately over the check point, means associated with the display means to form a movable cursor visible in the display and positionally referenced to the nadir point therein, means adjustable at will to shift the cursor to the location of the reference point on said display and thereby to derive error signals respectively related to co-ordinates of navigational error, and means connected for applying said error co-ordinate signals as navigational corrections to said computer means.

5. The apparatus defined in claim 4, wherein the navigational computer means is operatively connected to the image display means to initiate operation thereof.

References Cited by the Examiner

UNITED STATES PATENTS 3,230,524   1/1966   Flowers et al. _____ 343—5

CHESTER L. JUSTUS, *Primary Examiner.*

RODNEY D. BENNETT, *Examiner.*

B. L. RIBANDO, *Assistant Examiner.*